G. LEIGH.
Grain-Drill.
No. 40,270.
Patented Oct. 13, 1863.
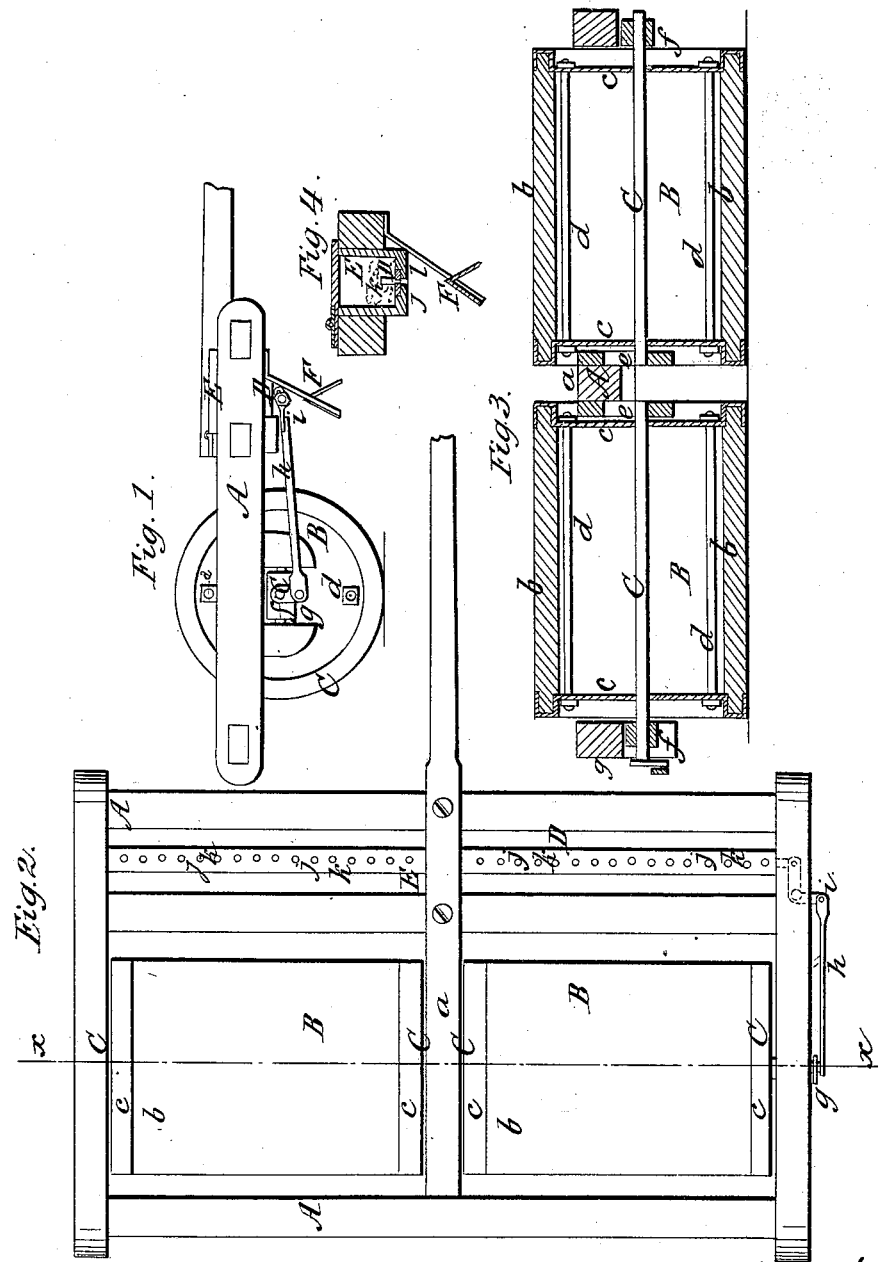

UNITED STATES PATENT OFFICE.

GIDEON LEIGH, OF CLINTON STATION, NEW JERSEY.

IMPROVEMENT IN GRAIN-DRILLS.

Specification forming part of Letters Patent No. 40,270, dated October 13, 1863.

*To all whom it may concern:*

Be it known that I, GIDEON LEIGH, of Clinton Station, in the county of Hunterdon and State of New Jersey, have invented a new and Improved Seed Planter and Roller; and I do hereby declare that the following is a full, clear, and exact description of the same, reference being had to the accompanying drawings, forming a part of this specification, in which—

Figure 1 represents a side elevation of my invention. Fig. 2 is a plan or top view of the same. Fig. 3 is a longitudinal vertical section of the same, taken in the plane indicated by the line $x\,x$, Fig. 2. Fig. 4 is a detached transverse vertical section of the seed-destributing device.

Similar letters of reference in the several views indicate corresponding parts.

The object of this invention is a simple, compact, and cheap implement for distributing timothy, clover, and other seeds and rolling them into the ground at one operation.

The construction and advantages of my implement will be readily understood from the following description :

A represents a frame, made of wood or any other suitable material, of sufficient size and strength for the intended operation. This frame rests upon the axles C of the rollers B, said rollers being made of such a width that they occupy the whole length of the frame, with the exception of the space occupied by the central cross-bar, $a$. The rollers B are constructed of thick boards $b$, the ends of which are fitted into grooved metallic heads $c$, and said heads are drawn together by screw-rods $d$, so that the boards $b$ are securely confined in the grooves of the heads, as clearly shown in Fig. 3 of the drawings. The axles C of the rollers have their bearings in the middle of the frame A in slotted standards $e$, suspended from the central cross-bar $a$, and at the ends in swivel-boxes $f$, which are hung upon pivots in such a manner that said boxes are allowed to accommodate themselves readily to the higher or lower position of the inner ends of the axles C. These inner ends rise and fall freely in the slots of the standards $e$, and if one of the rollers passes over a stone or other obstruction it rises readily without throwing the other roller off the ground or compelling the team to pull the whole machine over the said obstruction.

One of the axles C is provided at its outer end with a crank, $g$, which connects by a rod, $h$, with an elbow-lever, $i$, and this lever serves to impart a reciprocating motion to the seed-slide D. This slide works in the bottom of the hopper E, which is supported by the frame A in front of the rollers B, and said slide is provided with a series of discharge-holes, $j$, and stirrers $k$, the former to let the seed pass to the openings $l$ in the bottom of the hopper, and the latter to prevent the seed from clogging and insure a free discharge of the same. On dropping from the bottom of the hopper the seed strikes the scattering-board F, which is constructed with angular wings, as clearly shown in Figs. 1 and 4 of the drawings. By the action of this board the seed is evenly scattered over the ground in front of the rollers B, and by the rollers it is rolled into the ground, and the ground is left in a perfect condition for growing.

This implement is very cheap in its construction. It is simple and easy in its operation, and all its parts are so constructed that they are not liable to get out of repair.

What I claim as new, and desire to secure by Letters Patent, is—

The cranks $g$, rod $h$, and elbow-lever $i$, connecting the axle C of the rollers B with the seed-slide D, and constructed and operating, in combination with the stirrers $k$, in the manner and for the purposes shown and described.

GIDEON LEIGH.

Witnesses:
  N. W. CRAFT,
  R. C. CRAFT.